United States Patent
Chen et al.

(10) Patent No.: US 10,904,887 B2
(45) Date of Patent: Jan. 26, 2021

(54) RESOURCE SCHEDULING METHOD AND TERMINAL DEVICE

(71) Applicant: HUAWEI TECHNOLOGIES CO., LTD., Shenzhen (CN)

(72) Inventors: Guangri Chen, Shenzhen (CN); Mingchao Li, Beijing (CN); Guanglin Han, Munich (DE); Jun Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 29 days.

(21) Appl. No.: 16/178,697

(22) Filed: Nov. 2, 2018

(65) Prior Publication Data
US 2019/0075559 A1    Mar. 7, 2019

Related U.S. Application Data

(63) Continuation of application No. PCT/CN2016/080905, filed on May 3, 2016.

(51) Int. Cl.
| | |
|---|---|
| H04W 72/04 | (2009.01) |
| H04W 72/02 | (2009.01) |
| H04W 4/46 | (2018.01) |
| H04W 76/14 | (2018.01) |
| H04W 72/12 | (2009.01) |

(Continued)

(52) U.S. Cl.
CPC .......... *H04W 72/048* (2013.01); *H04W 4/46* (2018.02); *H04W 72/02* (2013.01); *H04W 72/0446* (2013.01); *H04W 72/1284* (2013.01); *H04W 74/0816* (2013.01); *H04W 76/14* (2018.02); *H04W 84/005* (2013.01)

(58) Field of Classification Search
CPC .................................................. H04W 72/048
See application file for complete search history.

(56) References Cited

U.S. PATENT DOCUMENTS

| | | | | |
|---|---|---|---|---|
| 2014/0269532 A1* | 9/2014 | Huang | .............. | H04W 74/0833 370/329 |
| 2016/0212596 A1* | 7/2016 | Brahmi | ............. | H04W 72/0406 |

(Continued)

FOREIGN PATENT DOCUMENTS

| | | |
|---|---|---|
| CN | 104427617 A | 3/2015 |
| CN | 104770030 A | 7/2015 |
| CN | 105142232 A | 12/2015 |

(Continued)

*Primary Examiner* — John D Blanton
(74) *Attorney, Agent, or Firm* — Kilpatrick Townsend & Stockton LLP (57) ABSTRACT

This application relates to the field of wireless communications, and in particular, to a resource scheduling technology for vehicle to vehicle communication in a wireless communications system. In a resource scheduling method, a first terminal device receives a second-vehicle message sent by at least one second terminal device, where the second-vehicle message carries vehicle status information of the second terminal device. The first terminal device determines a historical resource occupation status of the at least one second terminal device, and selects, based on the vehicle status information indicating a vehicle location and a traveling status of the second terminal device, a first resource used for sending a first-vehicle message.

18 Claims, 6 Drawing Sheets

(51) Int. Cl.
*H04W 74/08* (2009.01)
*H04W 84/00* (2009.01)

(56) References Cited

U.S. PATENT DOCUMENTS

2017/0142715 A1 5/2017 Li et al.
2019/0075603 A1* 3/2019 Hong ...................... H04W 4/40

FOREIGN PATENT DOCUMENTS

| | | |
|---|---|---|
| CN | 105391756 A | 3/2016 |
| EP | 2922339 A1 | 9/2015 |
| WO | 2014012244 A1 | 1/2014 |
| WO | 2015032436 A1 | 3/2015 |

* cited by examiner

SA pool          Data pool

FIG. 4

| Source ID 24 bits | Target ID 16 bits | Typical MAC sub-headers | Payload |

| Time | Location | Vehicle ID | Occupied resource (ID) | Resource occupation status |
|---|---|---|---|---|
| 14:00 | (116.41654, 39.91667) | 1 | 10 | Proper |
| 14:00 | (116.41654, 39.91670) | 2 | 12 | Proper |
| ... | ... | ... | ... | ... |
| 14:00 | (116.41657, 39.91669) | 6 | 14 | Improper |

| Source ID (16 bits) | Target ID (16 bits) | Length (32 bits) | Payload |

RESOURCE SCHEDULING METHOD AND TERMINAL DEVICE

CROSS-REFERENCE TO RELATED APPLICATIONS

This application is a continuation of International Application No. PCT/CN2016/080905, filed on May 3, 2016, the disclosure of which is hereby incorporated by reference in its entirety.

TECHNICAL FIELD

This application relates to the field of wireless communications, and in particular, to a resource scheduling technology for vehicle to vehicle communication in a wireless communications system.

BACKGROUND

With continuous development of society, vehicles are more and more popular. Driving travel brings some negative impact to the human society while facilitating travel of people. A rapid increase in a quantity of the vehicles causes a series of problems, such as urban traffic congestion, frequent traffic accidents, and environmental quality deterioration. From a plurality of aspects such as personal safety, transportation and travel efficiency, environmental protection, and economic effects, a complete Intelligent Transportation System (ITS for short) is required.

A concept of the Internet of Vehicles (IOV for short) derives from the Internet of Things (IOT for short). According to a definition of Industry Technology Innovation Strategic Alliance for the Internet of Vehicles, the Internet of Vehicles is a large system network used for wireless communication and information exchange between V (a vehicle) and X (X: a vehicle, a road, a pedestrian, the Internet, or the like) based on an intra-vehicle network, an inter-vehicle network, and an in-vehicle mobile Internet according to an agreed communications protocol and a data interaction standard. The Internet of Vehicles is an integrated network that can implement intelligent traffic management, an intelligent dynamic information service, and intelligent vehicle control, and is a typical application of an Internet of Things technology in the transportation system field.

Figure 1:
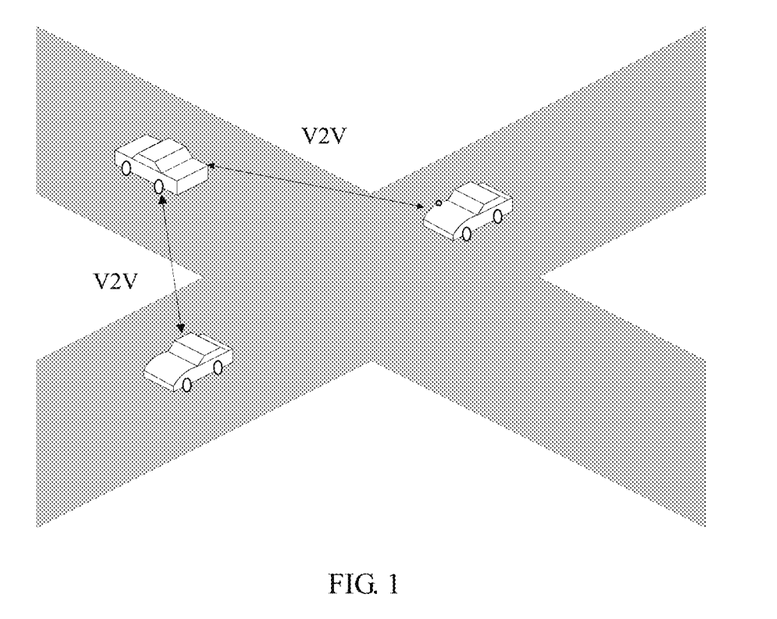
FIG. 1 is a schematic diagram of V2V communication in the prior art.

Currently, the vehicle may obtain road condition information or receive an information service based on a timely manner through vehicle to vehicle communication (V2V for short). As shown in FIG. 1, a vehicle 1, a vehicle 2, and a vehicle 3 communicate with each other through V2V, and broadcast traveling status information of the vehicles to surrounding vehicles. By obtaining this type of information, a driver can better perceive a traffic condition beyond a visual range, thereby determining a dangerous situation in advance and making avoidance.

Information needs to be sent frequently in V2V communication during an existing vehicle traveling process, especially in an area with relatively high vehicle density. Because of limited transmission resources, a transmission resource collision is likely to occur, causing a problem of low network transmission efficiency. Therefore, this art is in urgent need of a resource scheduling scheme in a traveling state to implement more proper transmission resource scheduling and allocation during a vehicle traveling process in a case of relatively high vehicle density on a road.

SUMMARY

Technical solutions provided in the present disclosure describe a resource scheduling method and a terminal device, so as to implement more proper and reliable communication between vehicles through more effective transmission resource scheduling.

According to an aspect, a resource scheduling method is provided, including:

receiving, by a first terminal device, a second-vehicle message sent by at least one second terminal device, where the second-vehicle message carries vehicle status information of the second terminal device, and the vehicle status information indicates a vehicle location and a traveling status of the second terminal device; and selecting, by the first terminal device based on a historical resource occupation status of the at least one second terminal device and the vehicle status information, a first resource used for sending a first-vehicle message, where the historical resource occupation status indicates a resource occupied by the second terminal device for sending a vehicle message and indicates whether resource occupation is proper. The first terminal device uses the historical resource occupation status of the second terminal device within a communication range as a reference to select a resource for the first terminal device, so that historical prior information is used for resource selection of the first terminal device. This improves message sending reliability. It should be noted that a terminal device type and a vehicle message type are not specifically limited in this embodiment of the present disclosure. Any terminal device and vehicle message capable of completing information exchange between vehicles may be used for the method in this embodiment of the present disclosure. For example, the terminal device may be an on-board unit, a mobile terminal, or the like, and the vehicle message may be periodic or may be periodic within a period of time, such as a CAM message or a DENM message.

In a possible design, the first terminal device obtains a third terminal device from the at least one second terminal device based on the vehicle status information of the at least one second terminal device, where a vehicle message sent by the third terminal device is a third-vehicle message, and a vehicle corresponding to the third terminal device and a vehicle corresponding to the first terminal device travel in a same direction when the first terminal device receives the third-vehicle message; and obtains the first resource based on a historical resource occupation status of the third terminal device. Optionally, the first terminal device may further estimate a first location at which the vehicle corresponding to the first terminal device arrives when sending the first-vehicle message, and determine that the third terminal device is at the first location when the first terminal device receives the third-vehicle message; and the first terminal device uses a resource used for sending the third-vehicle message by the third terminal device, as the first resource. Based on selection of the third terminal device, transmission resource scheduling for a vehicle is performed based on a historical resource occupation status of a vehicle traveling in a same direction and by referring to a historical road location of the vehicle. This implements, as far as possible, scheduling balancing of transmission resources for dynamically traveling vehicles on a road in a same traveling direction, to improve reliability and properness of message transmission between the vehicles.

In a possible design, the first terminal device estimates a first location at which the vehicle corresponding to the first terminal device arrives when sending the first-vehicle message; determines that the third terminal device is at the first location when the first terminal device receives the third-vehicle message; and calculates a resource collision probability at the first location. If the resource collision probability is low, the first terminal device uses a resource used for sending the third-vehicle message by the third terminal device, as the first resource; or if the resource collision probability is high, the first terminal device selects the first resource based on a preset scheduling manner, where the resource collision probability indicates a resource contention status between terminal devices at the first location. Optionally, the calculating a resource collision probability at the first location includes: estimating a total quantity of vehicles that are simultaneously located at the first location when the first terminal device sends the first-vehicle message, where if the total quantity of vehicles exceeds a specific threshold, the collision probability is high, or if the total quantity of vehicles does not exceed a specific threshold, the collision probability is low. Based on resource collision probability calculation, a quantity of vehicles arriving at a specified location may be pre-estimated. If the quantity of vehicles is excessively large, even if message transmission at the location at a current moment is not affected, a possibility of a resource collision at a next moment is greatly increased. Therefore, a valid reference is provided for resource scheduling for a vehicle.

In a possible design, the first terminal device estimates a first location at which the vehicle corresponding to the first terminal device arrives when sending the first-vehicle message; determines that the third terminal device is at the first location when the first terminal device receives the third-vehicle message; and performs transmission resource scheduling based on the historical resource occupation status of the third terminal device. However, in actual vehicle traveling, it is quite possible that no third terminal device is at the arrival location just in time. In this case, the first terminal device selects the first resource based on the preset scheduling manner. Therefore, a default resource scheduling manner is provided. For example, an idle resource may be randomly selected, or a resource that is being used may continue to be used, depending on an actual need.

In a possible design, receiving and processing functions of a terminal device are implemented at different layers, and a message is transmitted between the layers in a form of an inter-layer primitive. For example, the message is received at an application layer, and the message is processed at a media access control layer. An inter-layer primitive between the application layer and the media access layer includes a source ID, a target ID, a length, and a payload.

In a possible design, the vehicle status information may include a vehicle ID, a vehicle location, a vehicle speed, a traveling direction, turning information, and the like, and is used for obtaining and pre-estimating a status of a vehicle traveling within the communication range, for reference for resource scheduling.

According to another aspect, an embodiment of the present disclosure provides a structure of a terminal device. The terminal device has a function for implementing the terminal device behavior in the foregoing method process. The function may be implemented by hardware.

In a possible design, the structure of the terminal device includes a receiver and a processor. The receiver is configured to receive a second-vehicle message sent by at least one second terminal device, where the second-vehicle message carries vehicle status information of the second terminal device, and the vehicle status information indicates a vehicle location and a traveling status of the second terminal device; and the processor is configured to select, based on a historical resource occupation status of the at least one second terminal device and the vehicle status information, a first resource used for sending a first-vehicle message, where the historical resource occupation status indicates a resource occupied by the second terminal device for sending a vehicle message and indicates whether resource occupation is proper.

In a possible design, the structure of the terminal device further includes a transmitter, configured to send a vehicle-message. A message sending form may be broadcasting.

In a possible design, the structure of the terminal device further includes a memory, configured to access related data and an instruction used for execution.

According to still another aspect, an embodiment of the present disclosure provides a structure of another terminal device. The terminal device has a function for implementing the terminal device behavior in the foregoing method process. The function may be implemented by executing corresponding software by hardware, or may be implemented by one or more units that are corresponding to the foregoing function and that are included in the hardware.

Compared with a solution in the prior art, the solutions provided in the present disclosure can perform transmission resource scheduling for a vehicle message based on historical prior information, thereby improving properness and reliability of vehicle message exchange during traveling.

BRIEF DESCRIPTION OF DRAWINGS

The following describes in more detail the embodiments of the present disclosure with reference to accompanying drawings.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Long Term Evolution (Long Term Evolution, LTE for short) is a mainstream wireless communications technology currently, and is Long Term Evolution of Universal Mobile Telecommunications System (Universal Mobile Telecommunications System, UMTS for short) technical standards developed by the 3rd Generation Partnership Project (3GPP for short) organization.

A D2D technology is standardized as an important feature in 3GPP LTE Release 12. The technology is a technology that allows, under control of a system, direct communication between terminals by reusing a cell resource. Through D2D communication, when a distance between two terminal user devices is relatively short, the two terminal user devices may directly transmit data under control of a base station, with no need to forward the data by using an uplink and a downlink of the base station. D2D communication can enhance spectral efficiency of a cellular communications system, reduce transmit power of a terminal, and resolve a problem of spectral resource shortage in a wireless communications system to some extent.

Figure 2:
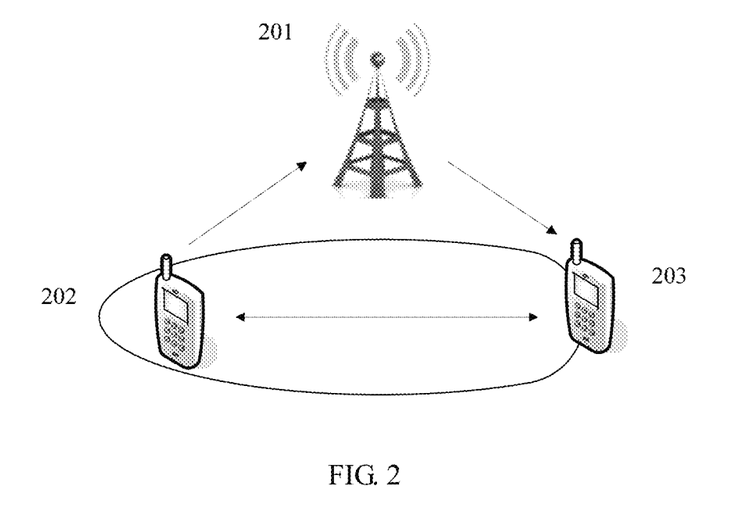
FIG. 2 is a schematic diagram of a D2D communication technology according to an embodiment of the present disclosure.

As shown in FIG. 2, the D2D communication technology is classified into centralized control communication and distributed control communication. In centralized control communication, a base station 201 controls a D2D connection, and the base station 201 obtains all link information by using measurement information reported by terminal devices (202 and 203). In distributed control communication, the terminal devices (202 and 203) automatically complete establishment and maintenance of a D2D link. Compared with centralized control communication, in distributed control communication, link information between the terminal devices (202 and 203) is more easily obtained, facilitating management and control of transmission resource allocation.

The solutions in the embodiments of the present disclosure implement vehicle communication during a vehicle traveling process by using a V2V communications system. A V2V service belongs to terminal direct communication, and is implemented based on D2D communication.

Figure 3:
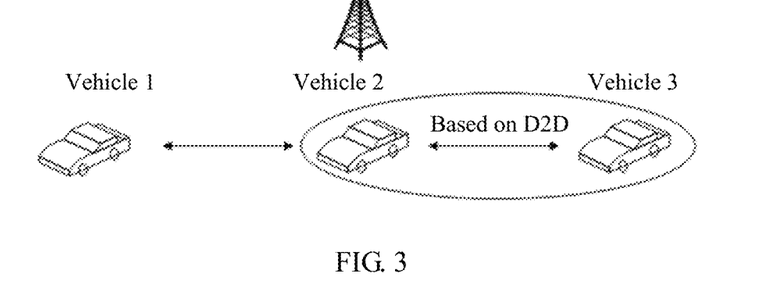
FIG. 3 is a schematic diagram of a possible application scenario of a V2V communications system according to an embodiment of the present disclosure.

As shown in FIG. 3, V2V connections are established between a vehicle 1, a vehicle 2, and a vehicle 3 through assistance of a base station. Actual V2V data communication does not require participation of the base station, but is completed by a vehicle terminal device. The terminal device corresponding to a vehicle related to the embodiments of the present disclosure may be a device that provides voice and/or data connectivity for a user, a handheld device with a wireless connection function, or another processing device connected to a wireless modem. A wireless device or unit may be a mobile terminal, such as a mobile phone (also referred to as a "cellular" phone) and a computer that has a mobile terminal, and for example, may be a portable mobile apparatus, a pocket-sized mobile apparatus, a handheld mobile apparatus, a computer built-in mobile apparatus, or an in-vehicle mobile apparatus, which exchanges languages and/or data with a radio access network. For example, the wireless device or unit may be a device such as a personal communications service (PCS) phone, a cordless phone, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile console, a remote station, an access point, a remote terminal, an access terminal, a user terminal, a user agent), a user device, or user equipment. For clearer understanding of a scheduling mechanism that is based on historical traveling status information and a historical resource occupation status, the embodiments of the present disclosure use V2V message sending through distributed transmission to describe the scheduling mechanism. However, a person skilled in the art should know that the present disclosure is applied not only to V2V communication but also to another transmission mode that can be used for D2D message transmission.

Figure 4:
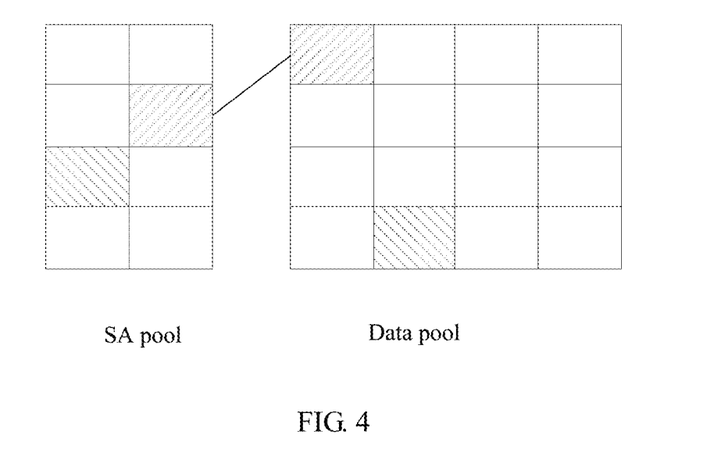
FIG. 4 is a schematic structural diagram of a resource pool according to an embodiment of the present disclosure.
Figure 5:
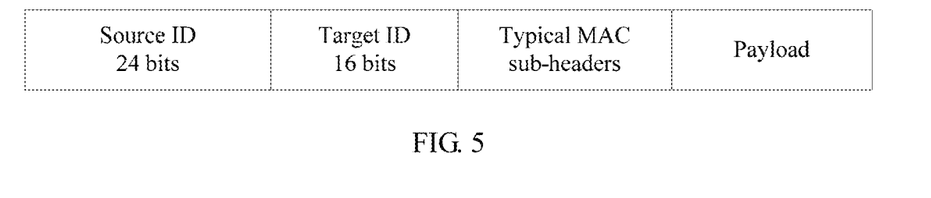
FIG. 5 is a schematic diagram of a structural format of a transmission message according to an embodiment of the present disclosure.

In a distributed control communication mode, a base station or an evolved NodeB eNB performs resource pool configuration, and groups network resources into one or more resource pools. When transmitting data, a terminal device needs to randomly select a resource from a resource pool to send data. As shown in FIG. 4, the resource pool usually includes a service area (SA for short) resource pool (SA Pool) and a data (Data) resource pool (Data Pool). A data sending form of the terminal device is (SA+data). To be specific, when a piece of data is generated, the terminal device at a transmit end first randomly selects an SA resource from the SA resource pool to send SA information, where the SA information indicates a time-frequency resource location in a data resource pool and a modulation and coding scheme, and the indicated time-frequency resource location is also randomly selected. Then, the terminal device at the transmit end sends the data at the corresponding time-frequency resource location in the data resource pool based on the indicated modulation and coding scheme. For a terminal device at a receive end, if the SA information sent by the transmit end is retrieved in the SA resource pool and is decoded successfully, the terminal device at the receive end receives the data based on the time-frequency resource location in the data resource pool indicated by the SA information, and performs decoding based on the indicated modulation and coding scheme. FIG. 5 is a reference format of a protocol data unit (PDU for short) representing data. The format includes a source ID, a target ID, a typical MAC sub-header, and a payload.

In an actual vehicle infrastructure cooperative system, a periodically triggered heartbeat message or an event triggered message is usually used for V2V service communication. Common messages include a CAM (Cooperative Awareness Message, cooperative awareness message) and a DENM (Decentralized Event Notification Message, decentralized event notification message). For the CAM, an on-board unit uses the CAM message to periodically broadcast vehicle information, so that a vehicle may be aware of dynamics of a nearby vehicle. For the DENM, once detecting a potential hazard event, the vehicle sends the DENM message to provide vehicle information, and duration of sending the message is determined based on an event type.

The CAM message is used as an example. The vehicle sends a V2V message to a surrounding vehicle in a broadcast manner. Usually, a coverage range is 300 meters to 500 meters, a transmit frequency is 1 Hz to 10 Hz, and a size approximately varies between 100 types and 800 bytes. Once a quantity of vehicles within an area exceeds 200, CAM messages of more than two vehicles need to be broadcast per millisecond within a minimum period of 100 ms. In addition, because the D2D distributed control mode uses a random sending mechanism, a terminal device randomly selects a transmission resource to send data. There may be a case in which a plurality of nearby users randomly select a same resource and send data. This causes a transmission collision. Further, with an increase of user density, such a collision becomes more obvious. In the Internet of Vehicles, because the vehicle needs to send V2V information frequently during a traveling process, service density is high, and a transmission resource collision problem may occur.

Therefore, when the vehicle performs broadcasting, transmission of a broadcast message may be affected because the vehicle is unable to know whether a collision or interference occurs in broadcasting of surrounding vehicles. According to the technical solutions provided in the embodiments of the present disclosure, transmission resource scheduling for a vehicle message is performed based on historical prior information through scheduling management of a D2D resource pool, thereby improving properness and reliability of vehicle message exchange during traveling.

Figure 6:
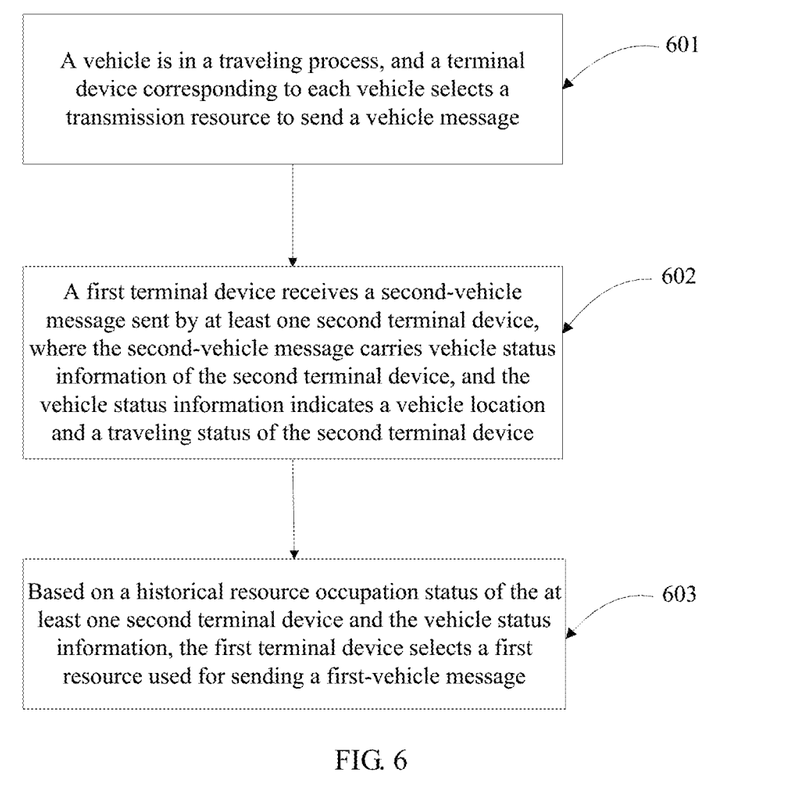
FIG. 6 is a schematic flowchart of a resource scheduling method according to an embodiment of the present disclosure.

With reference to FIG. 6, the following describes a process of a resource scheduling method provided in an embodiment of the present disclosure.

Step 601: A vehicle is in a traveling process, and a terminal device corresponding to each vehicle selects a transmission resource to send a vehicle message.

Figure 7:
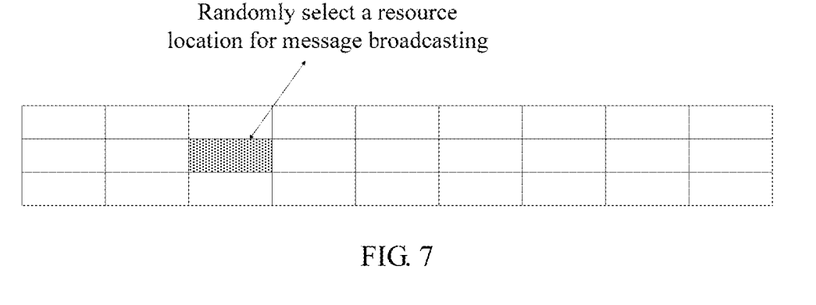
FIG. 7 is a schematic diagram of a resource grid and a selection manner according to an embodiment of the present disclosure.

In an example, the terminal device directly performs communication in a broadcast form, and a corresponding radio link is referred to as a D2D link. To prevent D2D communication from interfering with existing communication of an LTE system, a resource pool (Resource Pool) specialized for D2D communication is configured for the LTE system. As shown in FIG. 7, the resource pool is a set of time and frequency resources used for wireless communication. A radio spectrum resource pool specialized for V2V communication is divided from the D2D resource pool configured for the LTE, and the resource may be a spectrum of a frequency 10 MHz. The resource is segmented to obtain a frequency resource grid, and a segmentation granularity may be set as required.

In another example, the vehicle message is sent periodically, or periodically within a period of time. A CAM message is used as an example. The terminal device sends a message to a surrounding vehicle or RSU in a broadcast manner. Usually, a coverage range is 300 meters to 500 meters, a transmit frequency is 1 Hz to 10 Hz, and a size approximately varies between 100 types and 800 bytes. Vehicles traveling in different directions are in a traveling process. It can be learned from a left side of FIG. 8 that vehicles 1, 2, and 3 all travel leftwards, vehicles 4, 5, and 6 all travel rightwards, and vehicles 7, 8, and 9 all travel downwards. At an initial moment, the terminal device of each vehicle selects a resource in the grid based on a resource selection algorithm, and broadcasts the vehicle message in a vehicle message form (unless otherwise specified, the CAM message is used as an example hereinafter).

Figure 8:
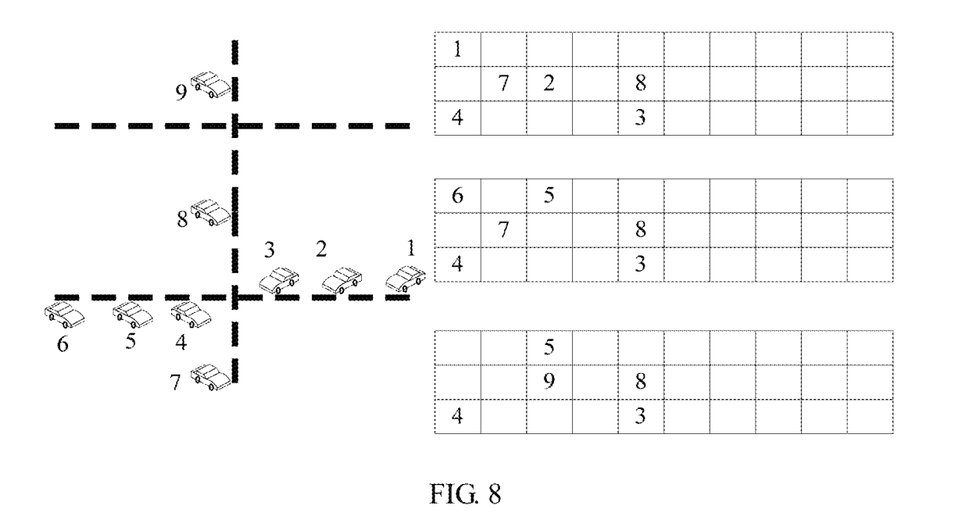
FIG. 8 is a schematic diagram of vehicle distribution and resource allocation in an initial traveling state according to an embodiment of the present disclosure.

In still another example, the terminal device of each vehicle uses the initially selected resource to send the vehicle message. Optionally, for a resource selection algorithm used in initial resource allocation, simple random selection may be used, such as listening for available CAM resources and randomly selecting one of the available CAM resources, or another preset allocation manner may be used, to ensure that the terminal device of each vehicle has a respective message transmission resource.

Step 602: A first terminal device receives a second-vehicle message sent by at least one second terminal device, where the second-vehicle message carries vehicle status information of the second terminal device, and the vehicle status information indicates a vehicle location and a traveling status of the second terminal device.

In an example, the vehicle status information includes a vehicle ID, a vehicle location, a vehicle speed, a traveling direction, turning information, and the like. It is assumed that the terminal device of each vehicle is distributed as shown in FIG. 8, and travels normally. After initial resource selection, the message is currently broadcast based on a resource allocation manner shown in a right side of FIG. 8. The vehicle message is sent on an allocated resource by using a specific coding scheme. The resource may be a physical quantity defined by time and frequency. The surrounding vehicle within a communication range receives the vehicle message sent by each vehicle, and parses the vehicle message to obtain the status information of the vehicle. The vehicle status information is used to indicate a current location of the vehicle, and may be used to calculate a traveling track of the vehicle in a period of time in the future, so as to provide a traveling location reference for resource scheduling. In another example, the vehicle message may be obtained by the terminal device by retrieving an SA message from an SA resource pool, then reading a resource location in the resource pool and a modulation and coding scheme based on the SA message, reading data from the foregoing location in the resource pool, and performing demodulation based on the modulation and coding scheme. In this way, terminal devices of a plurality of vehicles may communicate directly, and exchange messages directly with no need for a base station.

603: Based on a historical resource occupation status of the at least one second terminal device and the vehicle status information, the first terminal device selects a first resource used for sending a first-vehicle message.

The CAM message is used as an example. After 100 ms, a next vehicle message sending period arrives. The vehicle location of each vehicle changes during the traveling process, as shown in a left side of FIG. 9. At this time, the resource scheduling manner at the original location is used. As shown by a resource allocation manner in a right side of FIG. 9, some resources conflict. For example, in the initial resource allocation, a same resource is allocated to a vehicle 1 and a vehicle 6 for message transmission. When the next vehicle message sending period arrives, the vehicle 1 and the vehicle 6 occupy the same resource when sending messages, and a resource collision occurs. The vehicle 1 and the vehicle 6 do not receive a message transmitted at a current resource location when sending the messages to each other. Therefore, the vehicle 1 and the vehicle 6 cannot discover the resource collision between the vehicle 1 and the vehicle 6. Vehicle message transmission is interfered with, further resulting in a large-scale message transmission interruption and affecting traveling safety. The same case occurs on a vehicle 2 and a vehicle 9. It can be learned from the foregoing analysis that using previous resource allocation is likely to cause a collision in message transmission, affecting normal V2V communication. Therefore, in this embodiment of the present disclosure, the first terminal device obtains the historical resource occupation status of another terminal device within the communication range for subsequent transmission resource scheduling.

Figure 9:
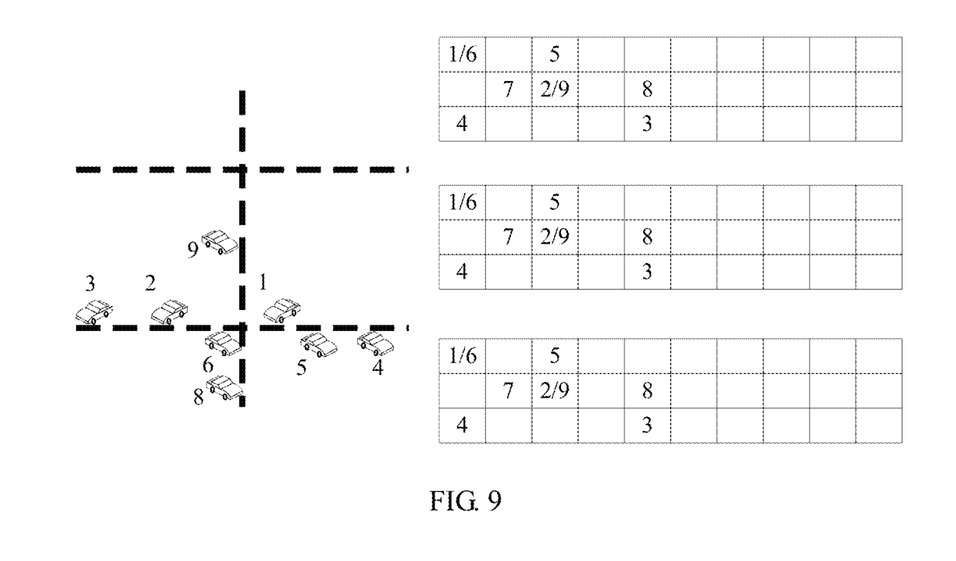
FIG. 9 is a schematic diagram of vehicle distribution and resource allocation in a traveling state according to an embodiment of the present disclosure.

In an example, the historical resource occupation status indicates a historical resource occupied by the at least one second terminal device and indicates whether occupation is proper. The historical resource includes a resource occupied by the at least one second terminal device for sending a message at a plurality of previous moments or times. If the message of the second terminal device is received by the first terminal device at the plurality of moments or times, it indicates that no resource collision occurs on the second terminal device, and resource occupation is proper. If it is inferred from a historical status of a vehicle corresponding to the second terminal device that the corresponding vehicle is within a range in which a message may be received currently, but no corresponding message is received, it indicates that a collision may occur in message transmission of the second terminal device, and resource occupation is improper. Specifically, the first terminal device may obtain a location of a second terminal device within the communication range at a current moment, and a traveling direction and speed of the second terminal device. In this way, the first terminal device may infer an approximate road location of the second terminal device at a next moment. If the second terminal device is still within the communication range, the first terminal device infers that a vehicle message of the second terminal device can be received. If no corresponding message is received, the first terminal device determines that a resource collision may occur on the second terminal device, and the resource occupation is improper.

For example, the first terminal device may store a historical resource occupation status table. The historical resource occupation status table includes a time, a location, a vehicle ID, an occupied resource, and a resource occupation status. For details, refer to FIG. 10. The location information may be identified by longitude and latitude information obtained by GPS. The occupied resource information may be indicated by a specific time-frequency location, or may be indicated by a resource ID when a resource length is fixed. For example, in time-frequency domain, every 100s is used as a resource location, and is numbered in sequence as a resource ID. The resource occupation status is used to indicate whether occupation of the specific resource at the specific time, at the specific location, and by the specific vehicle is proper. The vehicle terminal device may obtain the resource location of data based on the SA information obtained through search, and obtain the vehicle status information from the corresponding resource location for decoding, so as to obtain the resource location used by the corresponding vehicle in a current period. After the decoding, the vehicle terminal device obtains the status information such as the vehicle ID, the traveling speed, the traveling direction, and the turning information, and further obtains the historical resource occupation status information of each vehicle. Therefore, the first terminal device may obtain the occupied resource and the resource occupation status of the terminal device within the current communication range based on the maintained historical resource occupation status table of the at least one second terminal device, thereby facilitating subsequent transmission resource selection.

Figure 10:
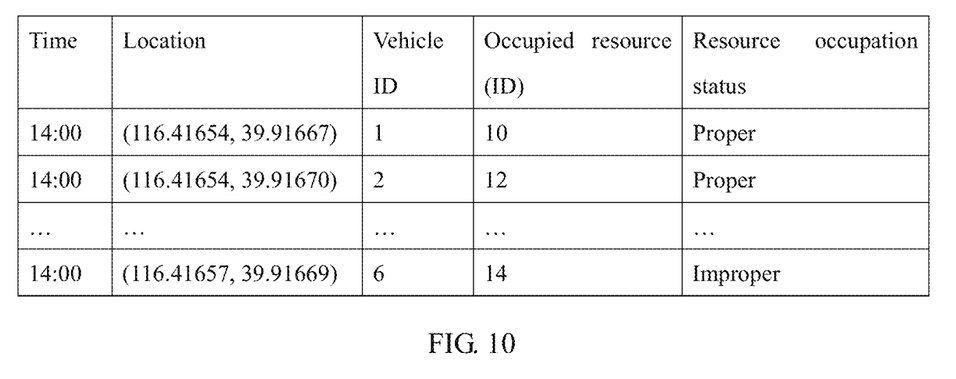
FIG. 10 shows a possible format of a historical resource occupation status table according to an embodiment of the present disclosure.

Further, for the vehicle terminal device, if the vehicle message of the corresponding vehicle is received within the current period, it indicates that the resource location of the vehicle in the current period is secure, and no obvious collision with the surrounding vehicle occurs. In other words, occupation of the resource location of the vehicle is proper in the current period. If the vehicle message of the vehicle is not received within the period, the resource location may be occupied by a plurality of surrounding vehicles, and as a result, message transmission is impeded. Therefore, the historical resource occupation status and the vehicle status information of each vehicle may be obtained by receiving and decoding the message of each vehicle.

In another example, the first terminal device obtains a third terminal device from the at least one second terminal device based on the vehicle status information of the at least one second terminal device, where a vehicle message sent by the third terminal device is a third-vehicle message, and a vehicle corresponding to the third terminal device and a vehicle corresponding to the first terminal device travel in a same direction when the first terminal device receives the third-vehicle message; and obtains the first resource based on a historical resource occupation status of the third terminal device. A vehicle selects a resource by referring to a historical resource occupation status of a vehicle traveling in a same direction, thereby maintaining, as far as possible, a balance and stability of resource allocation to terminal devices of the vehicles traveling in the same direction. This facilitates overall resource scheduling.

In still another example, the first terminal device estimates a first location at which the vehicle corresponding to the first terminal device arrives when sending the first-vehicle message; obtains a third terminal device from the at least one second terminal device based on the vehicle status information of the at least one second terminal device, where a vehicle message sent by the third terminal device is a third-vehicle message, and a vehicle corresponding to the third terminal device and a vehicle corresponding to the first terminal device travel in a same direction when the first terminal device receives the third-vehicle message; and determines that the third terminal device is at the first location when the first terminal device receives the third-vehicle message. The first terminal device uses a resource used for sending the third-vehicle message by the third terminal device, as the first resource. If it is determined that there is no third terminal device traveling in the same direction at the first location when the first terminal device receives the second-vehicle message, the first terminal device selects the first resource based on a preset scheduling manner.

For example, the terminal device calculates based on the foregoing historical resource occupation status and the vehicle status information, to obtain a road location to which the vehicle travels in the next sending period. Then, the terminal device obtains a historical resource occupation status of a previous vehicle at the estimated road location and performs analysis. According to the foregoing analysis, if a vehicle message of the previous vehicle is received, the terminal device may select the resource location as a resource location that may be used after the vehicle travels to the current road location in the next period. In this case, if it is determined based on previously received status information of the surrounding vehicle that the previous vehicle exists at the estimated road location, but the vehicle message of the previous vehicle is not received, it may be determined that a resource location collision may occur between the previous vehicle and the surrounding vehicle, and message transmission is affected; or it is determined based on the status information of the surrounding vehicle that the previous vehicle does not exist at the estimated road location, and certainly vehicle status information of the previous vehicle cannot be received. In this case, it needs to be determined whether to continue using a currently used resource location or occupy the historical resource location used by the previous vehicle, or perform random selection to allocate a new resource location based on a preset allocation manner, such as listening for an available resource location, so that when the vehicle arrives at the estimated road location in the next sending period, a proper resource location is allocated to avoid a resource collision and facilitate vehicle message transmission.

Figure 11:
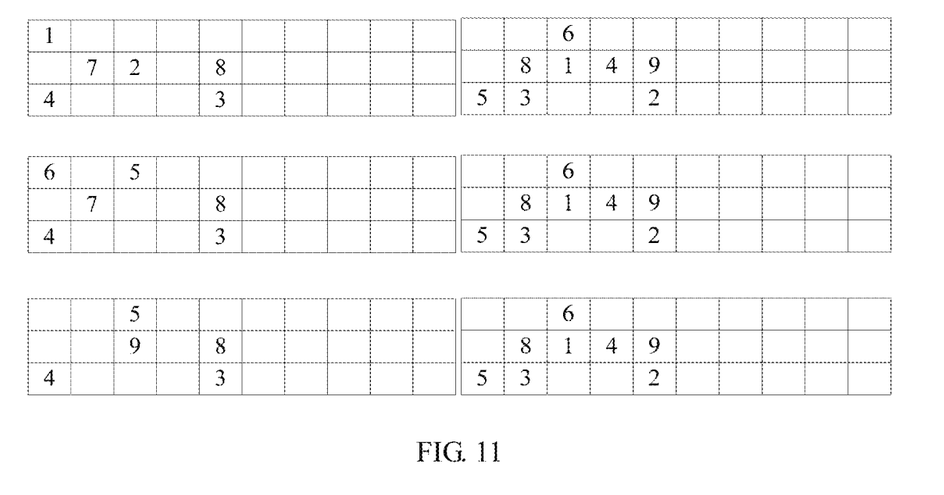
FIG. 11 is a schematic diagram of resource allocation in a traveling state according to an embodiment of the present disclosure.

Specifically, for vehicles traveling in a same direction, a vehicle status is a slowly changing process. For example, the vehicles travel in the same direction between two intersections, and a distance between the vehicles is relatively fixed. For example, in a relatively long period of time, a V2V vehicle message is transmitted for communication between vehicles 1, 2, and 3 at a fixed interval. For vehicles traveling face to face, such as vehicles 4, 5, and 6, compared with yellow vehicles, locations of the vehicles 4, 5, and 6 change relatively fast, and time for V2V vehicle message exchange is relatively short. According to a calculation based on a V2V communication distance of 300 m/500 m and a normal speed of 80 km/h, the foregoing vehicles traveling face to face meet and then travel away after 13.5 s/22.5 s. For vehicles traveling across each other, such as vehicles 7, 8, and 9, it may take shorter time to meet each other because of a factor such as blocking by a building. According to a calculation based on a CAM message period of approximately 100 ms, there are dozens to hundreds of messages exchanged during a period in which the vehicles traveling face to face or across each other meet each other. According to a resource selection manner in this embodiment, when the vehicles travel in the same direction, if a current vehicle can receive a vehicle message of a previous vehicle, it indicates that resource location occupation of the previous vehicle is proper and usable. Then, when traveling to a location of the previous vehicle in the next period, the current vehicle may select a location resource of the previous vehicle for transmission. As shown in resource mapping in a right side of FIG. 11, vehicles 1, 2, and 3 travel in a same direction. In a next sending period, the vehicle 1 performs sending based on a location resource of the previous vehicle 2, and the vehicle 2 performs sending based on a location resource of the previous vehicle 3. The vehicle 3 has no previous vehicle in the same direction, and a location resource is allocated randomly or based on a preset allocation manner. A resource allocation manner for a vehicle traveling in another direction may be deduced by analogy.

In still another example, the first terminal device estimates the first location at which the vehicle corresponding to the first terminal device arrives when sending the first-vehicle message; determines that the third terminal device is at the first location when the first terminal device receives the third-vehicle message; and calculates a resource collision probability at the first location. If the resource collision probability is low, the first terminal device uses the resource used for sending the third-vehicle message by the third terminal device, as the first resource, where the resource collision probability indicates a resource contention status between terminal devices at the first location; or if the resource collision probability is high, the first terminal device selects the first resource based on the preset scheduling manner, where the resource collision probability indicates a resource contention status between terminal devices at the first location.

Specifically, calculating the resource collision probability at the first location includes: estimating a total quantity of vehicles that are simultaneously located at the first location when the first terminal device sends the first-vehicle message, where if the total quantity of vehicles exceeds a specific threshold, the collision probability is high, or if the total quantity of vehicles does not exceed a specific threshold, the collision probability is low. In actual on-road traveling, especially in a case of high vehicle density, even if the first terminal device can receive the vehicle message of the terminal device of the previous vehicle traveling in the same direction at the estimated first location that is arrived at, it is possible that there are a relatively large quantity of vehicles arriving at the first location at a next moment. In this case, if the same vehicle resource scheduling manner is used, a relatively serious resource collision may be caused, losing meaning of resource pre-scheduling. Therefore, this example introduces calculation of the resource collision probability. On a premise that the vehicle message of the previous vehicle is received, the vehicle determines whether to use the resource occupied by the previous vehicle when the vehicle arrives at the first location at the next moment, so as to implement more proper resource scheduling in the case of high vehicle density.

A person skilled in the art may understand that a road traffic situation is characterized by relatively high suddenness, and involves a relatively large quantity of pavement and environment parameters. This embodiment of the present disclosure cannot cover all the related parameters for probability calculation. In actual resource scheduling, vehicle message transmission may include more types of parameters. In probability calculation, different parameters may be set based on a specific road condition and environment for reference, for example, a historical resource collision probability, an intersection condition (going straight, turning left, turning right, or turning around), or the like. These all fall within the protection scope of the present disclosure.

In still another example, the terminal device has receiving, processing, and sending functions. The foregoing functions may be all performed by a module, or may be designed to be performed by different modules. A specific manner of performing the functions may be implemented based on a structure of the terminal device or a V2V communication requirement. Optionally, the receiving and processing functions of the terminal device may be implemented at different layers, and a message is transmitted between the layers in a form of an inter-layer primitive. For example, the message is received at an application layer, and the message is processed at a media access control layer. An inter-layer primitive between the application layer and the media access layer includes a source ID, a target ID, a length, and a payload.

In this embodiment of the present disclosure, through collection of the historical resource occupation status of the terminal device of the surrounding vehicle, the terminal device of the current vehicle selects a resource for subsequent message sending, thereby implementing resource scheduling by using the prior information, and improving message transmission efficiency between vehicles.

Therefore, compared with a conventional random resource selection method, in the foregoing manner, a road location of a vehicle is estimated based on a travelling status, and completely random resource contention is avoided by using a historical resource occupation status, thereby effectively avoiding the resource collision and improving resource scheduling efficiency.

The foregoing embodiment mainly describes, from a perspective of interaction between vehicle terminal devices, the solutions provided in the embodiments of the present disclosure. It can be understood that, to implement the foregoing functions, various terminal devices, such as the mobile phone and the on-board unit, each include a corresponding hardware structure and/or software module for performing the functions. A person skilled in the art should be easily aware that, with reference to the method steps described in the embodiment disclosed in this specification, the present disclosure can be implemented in a form of hardware or a combination of hardware and computer software. Whether a function is implemented by hardware or by driving hardware by computer software depends on a particular application and a design constraint of the technical solutions. A person skilled in the art may use different methods to implement the described functions for each particular application, but it should not be considered that the implementation goes beyond the scope of the present disclosure.

Figure 12:
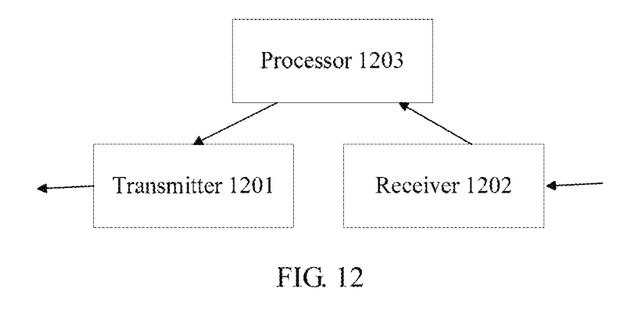
FIG. 12 is a schematic structural diagram of a terminal device according to an embodiment of the present disclosure.

FIG. 12 is a schematic diagram of a possible structure of a used vehicle terminal device.

The vehicle terminal device is configured with a transmitter 1201, a receiver 1202, and a processor 1203, and may further include a memory (not shown in the figure). A specific structure composition of the vehicle terminal device is responsible for supporting the resource scheduling method process provided in the embodiment corresponding to FIG. 6 of the present disclosure.

In an example, the receiver 1202 receives at least one vehicle message, parses the vehicle message to obtain vehicle status information, obtains a historical resource occupation status of a vehicle, and sends the vehicle status information and the historical resource occupation status to the processor 1203. The vehicle status information indicates a vehicle location and a traveling status of a terminal device corresponding to the received vehicle message.

In another example, the transmitter 1201 is configured to send a message. The message includes a vehicle message. An interval for sending the vehicle message may be random, periodic, or periodic within a period of time.

In still another example, the processor 1203 selects, based on a historical resource occupation status and vehicle status information of a terminal device of a surrounding vehicle, a resource for sending a next vehicle message of the vehicle corresponding to the vehicle terminal device. The historical resource occupation status indicates a resource occupied by a second terminal device for sending a vehicle message and indicates whether resource occupation is proper.

The processor in this embodiment of the present disclosure may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor can implement or execute various example logical blocks, modules, and circuits that are described with reference to the content disclosed in the present disclosure. The processor may alternatively be a combination for implementing computing functions, for example, a combination of one or more microprocessors or a combination of a DSP and a microprocessor.

A person skilled in the art may understand that, for the terminal device, functions of the transmitter, the receiver, and the processor are not limited to functions that assist in performing the resource scheduling method process provided in the embodiments of the present disclosure, and may also be used to assist in performing another function of the terminal device, such as a basic communication function or execution of various application programs. Details are not described herein.

Figure 13:
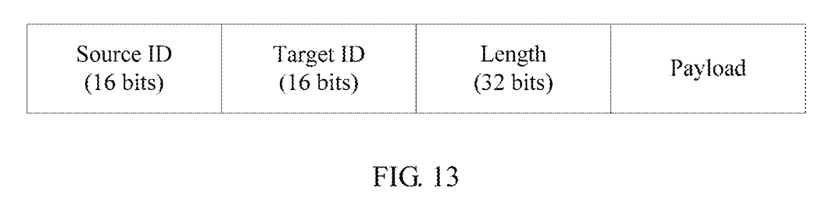
FIG. 13 is a schematic diagram of a structural format of an inter-layer primitive message according to an embodiment of the present disclosure.

In an example, the terminal device, used as a communications entity on a whole, is responsible for message transmission between terminal devices, and may be specifically divided into a physical layer, a media access control layer, a radio link control layer, an application layer, and the like. Each layer performs a respective corresponding function to complete communication between the terminal devices. For example, the processor, as a main execution part, is responsible for generating a message and processing a received message, and is disposed at the media access control layer (MAC). The receiver is configured to be responsible for message reception and preprocessing, that is, be mainly responsible for interacting with another terminal device, and is disposed at the upper application layer (APP). Communication between the receiver and the processor disposed at different layers may be completed depending on a primitive. The primitive is a parameter used for transmitting data and control information when a service provider uses some actions or reports an action performed by a peer entity. As a communication manner between layers, the primitive is used to complete message transmission and communication between the receiver and the processor. As shown in FIG. 13, the inter-layer primitive includes a source (source) ID, a target (target) ID, a length (length), and a payload (payload) part.

It should be noted that, for a specific implementation of the scheduling method executed by the foregoing terminal device, refer to the description in the method embodiment of FIG. 6. The embodiment of the terminal device is based on an idea the same as that of the method embodiment, and brings a technical effect the same as that of the method embodiment of the present disclosure. For specific content, refer to the description in the method embodiment of the present disclosure, and details are not described herein again.

Figure 14:
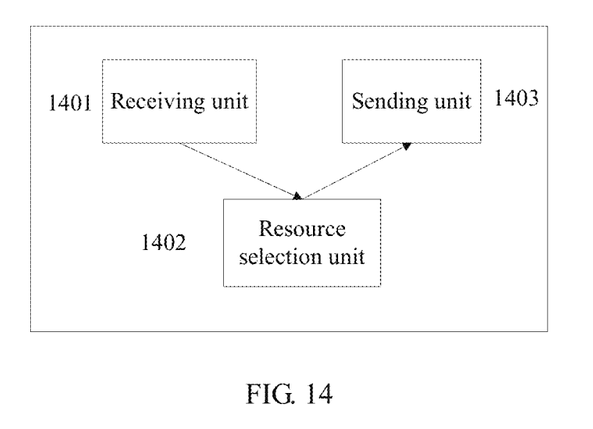
FIG. 14 is a schematic structural diagram of another terminal device according to an embodiment of the present disclosure.

FIG. 14 is a schematic diagram of another possible structure of a used vehicle terminal device.

The vehicle terminal device includes a receiving unit 1401, a resource selection unit 1402, and a sending unit 1403, and may further include a storage unit and the like (not shown in the figure) depending on an actual requirement.

The receiving unit 1401 is configured to receive a second-vehicle message sent by at least one second terminal device, where the second-vehicle message carries vehicle status information of the second terminal device, and the vehicle status information indicates a vehicle location and a traveling status of the second terminal device.

The resource selection unit 1402 selects, based on a historical resource occupation status of the at least one second terminal device and the vehicle status information, a first resource used for sending a first-vehicle message, where the historical resource occupation status indicates a resource occupied by the second terminal device for sending a vehicle message and indicates whether resource occupation is proper.

The sending unit 1403 is configured to send the first-vehicle message based on the selected first resource.

In an example, the resource selection unit 1402 obtains a third terminal device from the at least one second terminal device based on the vehicle status information of the at least one second terminal device, where a vehicle message sent by the third terminal device is a third-vehicle message, and a vehicle corresponding to the third terminal device and a vehicle corresponding to the first terminal device travel in a same direction when the first terminal device receives the third-vehicle message; and obtains the first resource based on a historical resource occupation status of the third terminal device.

In another example, the terminal device, used as a communications entity on a whole, is responsible for message transmission between terminal devices, and may be specifically divided into a physical layer, a media access control layer, a radio link control layer, an application layer, and the like. Each layer performs a respective corresponding function to complete communication between the terminal devices. For example, the resource selection unit 1402, as a main execution part, is responsible for generating a message and processing a received message, and is disposed at the media access control layer (MAC). The receiving unit 1401 is configured to be responsible for message reception and preprocessing, that is, be mainly responsible for interacting with another terminal device, and is disposed at the upper application layer (APP). Communication between the resource selection unit 1402 and the receiving unit 1401 disposed at different layers may be completed depending on a primitive. For a primitive description, refer to the implementation corresponding to FIG. 13, and details are not described herein again.

The terminal device in this embodiment may be configured to execute the method in the embodiment corresponding to the foregoing FIG. 6. For a specific implementation of vehicle message sending and reception, resource selection processing, and the like performed by the terminal device, refer to the description in the method embodiment. Specific functions of the resource selection unit, the sending unit, and the receiving unit of the terminal device are corresponding to the functions in the method embodiment corresponding to FIG. 6. Terms and implementation details are similar to those in the method embodiment of FIG. 6.

The terminal device in this embodiment may perform transmission resource scheduling for a vehicle message based on historical prior information through scheduling management of a D2D resource pool, thereby improving properness and reliability of vehicle message exchange during traveling.

The method steps described with reference to the content disclosed in the present disclosure may be implemented by using hardware, or may be implemented by a processor executing a software instruction. The software instruction may include a corresponding software module. The software module may be stored in a RAM memory, a flash memory, a ROM memory, an EPROM memory, an EEPROM memory, a register, a hard disk, a removable hard disk, a CD-ROM, or a storage medium in any other form well known in the art. A storage medium used as an example is coupled to the processor, so that the processor can read information from the storage medium, and can write information into the storage medium. Certainly, the storage medium may be a component of the processor. The processor and the storage medium may be located in an application-specific integrated circuit (ASIC). In addition, the ASIC may be located in the terminal device. Certainly, the processor and the storage medium may exist in the terminal device as discrete components.

A person of skill in the art should be aware that in one or more of the foregoing examples, the functions described in the present disclosure may be implemented by using hardware, software, firmware, or any combination thereof. When being implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

The objectives, technical solutions, and beneficial effects of the present disclosure are further described in detail in the foregoing specific implementations. It should be understood that the foregoing descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A resource scheduling method, comprising:
   receiving, by a first terminal device, a second-vehicle message sent by at least one second terminal device, wherein the second-vehicle message carries vehicle status information of the second terminal device, and the vehicle status information indicates a vehicle location and a traveling status of the second terminal device; and
   selecting, by the first terminal device based on a historical resource occupation status of the at least one second terminal device and the vehicle status information, a first resource used for sending a first-vehicle message, wherein the historical resource occupation status indicates a resource occupied by the second terminal device for sending a vehicle message and indicates whether resource occupation is proper; and, wherein the vehicle status information comprises a vehicle ID, a vehicle location, a vehicle speed, a traveling direction, and turning information.

2. The method according to claim 1, wherein
   the selecting, by the first terminal device based on a historical resource occupation status of the at least one second terminal device and the vehicle status information, a first resource used for sending a first-vehicle message comprises:
   determining a third terminal device from the at least one second terminal device based on the vehicle status information of the at least one second terminal device, wherein a vehicle message sent by the third terminal device is a third-vehicle message, and a vehicle corresponding to the third terminal device and a vehicle corresponding to the first terminal device travel in a same direction when the first terminal device receives the third-vehicle message; and
   obtaining the first resource based on a historical resource occupation status of the third terminal device.

3. The method according to claim 2, wherein the obtaining the first resource based on a historical resource occupation status of the third terminal device comprises:
   estimating a first location at which the vehicle corresponding to the first terminal device arrives when sending the first-vehicle message;
   determining that the third terminal device is at the first location when the first terminal device receives the third-vehicle message; and
   using, by the first terminal device, a resource used for sending the third-vehicle message by the third terminal device, as the first resource.

4. The method according to claim 2, wherein the obtaining the first resource based on a historical resource occupation status of the third terminal device comprises:
estimating a first location at which the vehicle corresponding to the first terminal device arrives when sending the first-vehicle message;
determining that the third terminal device is at the first location when the first terminal device receives the third-vehicle message; and
calculating a resource collision probability at the first location, and if the resource collision probability is low, using, by the first terminal device, a resource used for sending the third-vehicle message by the third terminal device, as the first resource, wherein the resource collision probability indicates a resource contention status between terminal devices at the first location.

5. The method according to claim 4, wherein
the calculating a resource collision probability at the first location comprises: estimating a total quantity of vehicles that are simultaneously located at the first location when the first terminal device sends the first-vehicle message, wherein if the total quantity of vehicles exceeds a specific threshold, the resource collision probability is high, or if the total quantity of vehicles does not exceed a specific threshold, the collision probability is low.

6. The method according to claim 2, wherein the obtaining the first resource based on a historical resource occupation status of the third terminal device comprises:
estimating a first location at which the vehicle corresponding to the first terminal device arrives when sending the first-vehicle message;
determining that the third terminal device is at the first location when the first terminal device receives the third-vehicle message; and
calculating a resource collision probability at the first location; and if the resource collision probability is high, selecting, by the first terminal device, the first resource based on a preset scheduling manner, wherein the resource collision probability indicates a resource contention status between terminal devices at the first location.

7. The method according to claim 6, wherein
if it is determined that there is no third terminal device traveling in the same direction at the first location when the first terminal device receives the second-vehicle message, the first terminal device selects the first resource based on the preset scheduling manner.

8. The method according to claim 6, wherein
the preset scheduling manner comprises randomly selecting an idle resource or continuing to use a resource that is being used.

9. The method according to claim 1, further comprising:
receiving a vehicle message at an application (APP) layer, and sending the vehicle message to a media access control (MAC) layer by using an inter-layer primitive, wherein the inter-layer primitive comprises a source ID, a target ID, a length, and a payload.

10. An apparatus, comprising:
a receiver, configured to receive a second-vehicle message sent by at least one second terminal device, wherein the second-vehicle message carries vehicle status information of the second terminal device, and the vehicle status information indicates a vehicle location and a traveling status of the second terminal device; and
a processor, configured to select, based on a historical resource occupation status of the at least one second terminal device and the vehicle status information, a first resource used for sending a first-vehicle message by a transmitter, wherein the historical resource occupation status indicates a resource occupied by the second terminal device for sending a vehicle message and indicates whether resource occupation is proper; and, wherein the vehicle status information comprises a vehicle ID, a vehicle location, a vehicle speed, a traveling direction, and turning information.

11. The apparatus according to claim 10, wherein the processor is configured to:
determine a third terminal device from the at least one second terminal device based on the vehicle status information of the at least one second terminal device, wherein a vehicle message sent by the third terminal device is a third-vehicle message, and a vehicle corresponding to the third terminal device and a vehicle corresponding to the receiver travel in a same direction when the receiver receives the third-vehicle message; and
obtain the first resource based on a historical resource occupation status of the third terminal device.

12. The apparatus according to claim 11, wherein the processor is configured to:
estimate a first location at which a vehicle corresponding to the transmitter arrives when the transmitter sends the first-vehicle message;
determine that the third terminal device is at the first location when the receiver receives the third-vehicle message; and
use a resource used for sending the third-vehicle message by the third terminal device, as the first resource.

13. The apparatus according to claim 11, wherein the processor is configured to:
estimate a first location at which a vehicle corresponding to the transmitter arrives when the transmitter sends the first-vehicle message;
determine that the third terminal device is at the first location when the receiver receives the third-vehicle message; and
calculate a resource collision probability at the first location, and if the resource collision probability is low, use a resource used for sending the third-vehicle message by the third terminal device, as the first resource, wherein the resource collision probability indicates a resource contention status between terminal devices at the first location.

14. The apparatus according to claim 13, wherein
the processor is configured to estimate a total quantity of vehicles that are simultaneously located at the first location when the transmitter sends the first-vehicle message, wherein if the total quantity of vehicles exceeds a specific threshold, the collision probability is high, or if the total quantity of vehicles does not exceed a specific threshold, the collision probability is low.

15. The apparatus according to claim 11, wherein the processor is configured to:
estimate a first location at which a vehicle corresponding to the transmitter arrives when the transmitter sends the first-vehicle message;
determine that the third terminal device is at the first location when the receiver receives the third-vehicle message; and
calculate a resource collision probability at the first location; and if the resource collision probability is high, select the first resource based on a preset scheduling manner, wherein the resource collision probability indicates a resource contention status between terminal devices at the first location.

16. The apparatus according to claim 15, wherein the processor is further configured to, if it is determined that there is no third terminal device traveling in the same direction at the first location when the receiver receives the second-vehicle message, select the first resource based on the preset scheduling manner.

17. The apparatus according to claim 15, wherein the preset scheduling manner comprises randomly selecting an idle resource or continuing to use a resource that is being used.

18. The apparatus according to claim 10, wherein the receiver is disposed at an application (APP) layer, the processor is disposed at a media access control (MAC) layer, and the receiver and the processor transmit a message by using an inter-layer primitive, wherein the inter-layer primitive comprises a source ID, a target ID, a length, and a payload.

* * * * *